Jan. 29, 1935.  C. W. KANOLT  1,989,553

CHANGEABLE COLORED PICTURE

Filed May 2, 1928

Inventor
Clarence W. Kanolt
By Vernon E. Hodges
his Attorney

Patented Jan. 29, 1935

1,989,553

UNITED STATES PATENT OFFICE 1,989,553

CHANGEABLE COLORED PICTURE

Clarence W. Kanolt, New York, N. Y.

Application May 2, 1928, Serial No. 274,600

8 Claims. (Cl. 88—1)

This invention relates to an improvement in changeable colored pictures.

The invention is an improvement on the changeable pictures disclosed in my prior Patents Nos. 1,150,374 of August 17, 1915 and 1,260,682 of March 26, 1918.

The object of this invention is to produce the changeable effects disclosed in those patents but to combine with the changeable effects colored pictures or to produce the changeable pictures with colors.

My new invention presents a means of producing in colors stereoscopic or changeable pictures such as have been described in the above-mentioned patents. The invention involves the application to pictures of this character of the method of color photography known as the Joly-McDonough method, or of some other related method. This method is described in McDonough's United States Patent No. 611,457 of September 27, 1898.

Figure 1:
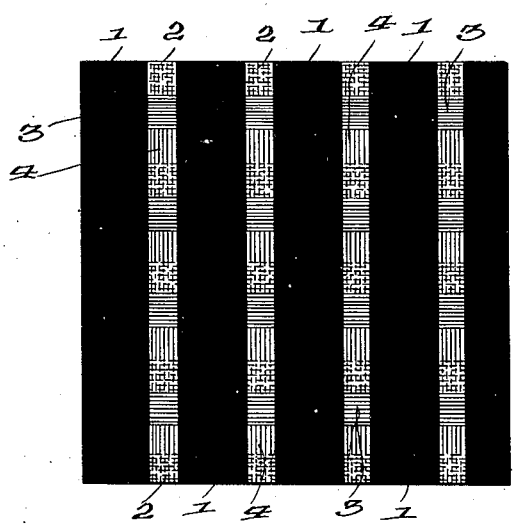
Fig. 1 is a front elevation of a combined lined and color screen.

Referring to the old style of camera screen shown in Figs. 5 and 6 of my Patent No. 1,260,682, the lines in the lined screen are vertical. Suppose now that by any suitable device we permit light of each one of certain colors, preferably three colors approximating primary colors, to fall only upon certain restricted narrow areas of the photographic plate, these areas having some other form than vertical strips or lines. For example, we may employ a color screen having three colors distributed in separate areas, preferably in the form of narrow horizontal lines alternating in color, as shown in Fig. 1 of McDonough's Patent No. 611,457. These colored areas should be near the sensitive film and on the side of it toward the camera lens, so that all light reaching the plate from the lens must pass through them. They might be placed between the sensitive film and the lined screen. They might form a part of the design of the lined screen itself, in which case it might have such an appearance as is shown in front elevation on an enlarged scale in Fig. 1, in which the areas 1 are opaque, the areas 2 are yellow, the areas 3 are blue and the areas 4 are red. They might be placed between the support of the screen film and the screen film. They might consist of colored areas in the support of the screen film itself. They might be placed on the rear face of the support of the screen film, if its thickness is not too great. They might be placed on a separate support back of the support of the screen film, if the latter support is not too thick. The screen film just referred to is the film of gelatine or other material which contains alternate opaque and transparent lines and constitutes a lined screen. It is usually carried on a glass plate which forms what has been called "the support of the screen film.

I will now describe another device which permits light of each one of certain colors to fall only upon certain restricted areas of the photographic plate. This method is an application of the invention of Berthon (Patent No. 992,151). I may place in the lens of the camera a trichromatic screen of the kind shown in Berthon's Fig. 7. I may form on the rear face of the support of the screen film horizontal ridges as shown in Berthon's Figs. 5 and 6. If these are at a suitable distance back of the photographic sensitive surface they will cause the rays of the three colors from the lens to fall upon areas of the plate having the form of alternating narrow horizontal strips.

I may modify Berthon's method using the trichromatic screen in the camera lens as before, but replacing the horizontal ridges just referred to by a lined screen placed at a suitable distance from the photographic sensitive surface on the side of it toward the lens and carrying transparent and opaque portions disposed in the form of narrow horizontal lines or strips.

Each of these methods permits light of each color to fall only upon certain restricted areas. After the photographic plate so exposed has been developed it can be reversed by means known to photographers, thus producing a diapositive (positive transparency); or it can be fixed as a negative and from it positives on glass, paper or other support can be produced by photographic printing.

Figure 2:
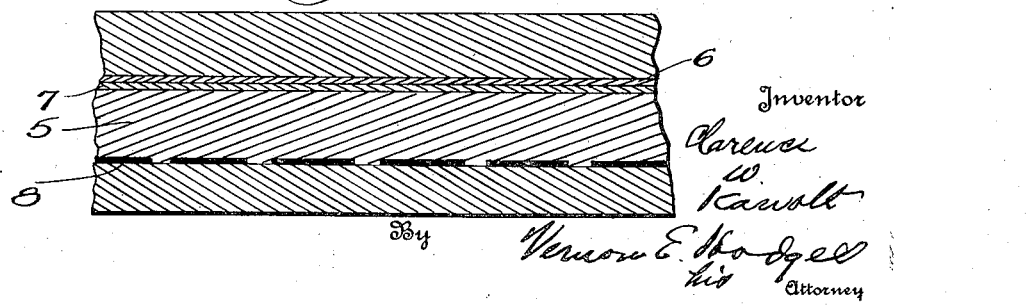
Fig. 2 is an enlarged sectional view of a transparent picture and a color screen.

I will now describe ways in which such a positive can be viewed so as to exhibit in colors the stereoscopic or changeable effect obtained without colors in my older inventions. I will begin with the case of a positive on glass or other transparent material, which is to be viewed by transmitted light. One of the several possible arrangements is shown in Fig. 2, which may be compared with Fig. 6 of my Patent No. 1,260,682, which illustrates a similar device for exhibiting stereoscopic or changeable transparencies but without colors. It differs from Fig. 6 in presenting at 5 a transparent support carrying on its rear face and adjacent to the photographic film at 6 a color screen 7, consisting of alternating horizontal colored lines or other patterns having the same form as the distributions of color on the photographic plate when it was exposed and so disposed relative to the positive film 6 that each area of this positive film has superimposed upon it an element of color screen of substantially the same color as the light that fell upon the corresponding part of the photographic plate when it was exposed in the camera. The support 5 might be omitted, the color screen 7 being in the form of colored lines or patterns printed or otherwise applied directly upon the photographic film 6. In that case the film 6 with the color screen 7 would still need to be separated by a space of suitable thickness from the lined screen 8. The support 5, instead of entirely filling this space, might fill it only partially. Another variation of the arrangement is presented by placing the color screen 7 immediately behind the photographic film 6, instead of immediately in front of it as in Fig. 2. In this case again the film 6 and the color screen 7 may be both carried by the same support or each carried by a separate support.

Figure 3:
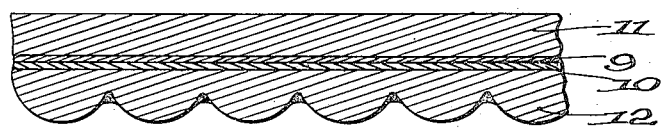
Fig. 3 is a similar view of an opaque picture and a color screen.

A method of exhibiting opaque stereoscopic or changeable pictures in colors using reflected light is shown in Fig. 3. This may be compared with Fig. 1 of my Patent No. 1,150,374, which presents a method of exhibiting such pictures without colors. This device differs from that of said Fig. 1, in that in front of the positive photographic film 9, there is placed a color screen 10, which presents the same distribution of color as the distribution of colors on the photographic plate exposed in the camera. In place of this arrangement the color screen 10 might be placed directly behind the photographic film 9, instead of directly in front of it. The photographic film 9 is carried upon a base 11; while the color screen 10 has a sheet of transparent material 12 disposed in front of it having magnifying ridges formed in the face thereof.

In the preceding paragraphs I have referred especially to color screens comprising colors disposed in alternating horizontal lines. While I prefer this pattern, there are many other patterns in which the colors might be distributed and I do not limit myself to this pattern. However, it is not desirable that the colors should be disposed in vertical lines, or lines that are nearly vertical, because then there might be opposite one of the vertical transparent lines of the lined screen, or opposite a considerable portion of the line only a single color, and then a true reproduction of the colors of the object photographed could not in general be accomplished.

By the term "lined screen" in the claims, I contemplate any arrangement which will obtain the effects of a lined screen, whether the alternate transparent and opaque lines or the parallel cylindrical lenses are used, or some similar arrangement for obtaining the result.

I claim:—

1. A stereoscopic color picture comprising the combination of a lineator, a color screen associated therewith having colored areas angularly related with respect to the elements of said lineator, and a photographic record associated with said lineator and said color screen, said photographic record comprising elementary record portions aligned with the elements of said lineator and representing different angular views of an object, each of said record portions comprising a plurality of color areas distributed in accordance with the color separation of said color screen and representing the natural colors of the corresponding portion of said object.

2. A stereoscopic color picture comprising in combination a lined screen, a color screen associated therewith having colored areas angularly related with respect to the lines of said lined screen, and a photographic record associated with said lined screen and said color screen, said photographic record comprising elementary record portions aligned with the elements of said lined screen and representing different angular views of an object, each of said record portions comprising a plurality of color areas distributed in accordance with the color separation of said color screen and representing the natural colors of the corresponding portion of said object.

3. A stereoscopic color picture comprising in combination a lined screen, a color screen associated therewith having colored arears arranged approximately at right-angles to the lines of the lined screen, and a photographic record associated with said lined screen and said color screen, said color screen being arranged between the lined screen and the photographic record, said photographic record comprising elementary record portions aligned with the elements of said lined screen and representing different angular views of an object, each of said record portions comprising a plurality of color areas distributed in accordance with the color separation of said color screen and representing the natural colors of the corresponding portion of said object.

4. In a stereoscopic picture, the combination of a lineator, a color screen associated therewith comprising colored areas angularly related to the lines of the lineator, and a positive picture having areas representing different angular views of an object and so distributed relative to the lineator as to produce a stereoscopic effect when viewed through the lineator, each of said last-mentioned areas comprising a plurality of color areas so distributed relative to the color screen as to reproduce the natural colors of the corresponding part of the object photographed.

5. In a stereoscopic picture, the combination of a lined screen, a color screen associated therewith comprising colored lines angularly related to the lines of the lined screen, and a photographic positive having areas representing different angular views of an object and so distributed relative to the lined screen as to produce a stereoscopic effect when viewed through the lined screen, each of said areas comprising a plurality of color areas so distributed relative to the color screen as to reproduce the natural colors of the corresponding part of the object photographed.

6. In a stereoscopic picture, the combination of a lined screen, a color screen associated therewith and having colored lines approximately at right angles to the lines of the lined screen and a photographic positive having areas representing different angular views of an object and so distributed relative to the lined screen as to produce a stereoscopic effect when viewed through the lined screen, each of said areas comprising a plurality of color areas so distributed relative to the color screen as to reproduce the natural colors of the corresponding part of the object photographed.

7. In a stereoscopic picture, the combination of a lined screen, a color screen associated therewith and having colored lines approximately at right-angles to the lines of the lined screen, and a photographic positive having areas representing different angular views of an object and so distributed relative to the lined screen as to produce a stereoscopic effect when viewed through the lined screen, each of said areas comprising a plurality of color areas so distributed relative to the color screen as to reproduce the natural colors of the corresponding part of the object photographed, said color screen being arranged between the lined screen and the photographic positive.

8. A stereoscopic parallax panoramagram color record comprising a ridged transparent member, a plurality of strip images of an object associated with said ridged transparent member, each of said images being a photographic record of the object from a slightly different point of view, said images having a plurality of juxtapositioned linear color records lying at right-angles to the longitudinal axes of said strip images adapted to reproduce the natural colors of the object, and selective ray filtering means whereby said images may be viewed in natural colors.

CLARENCE W. KANOLT.